Figure 1:
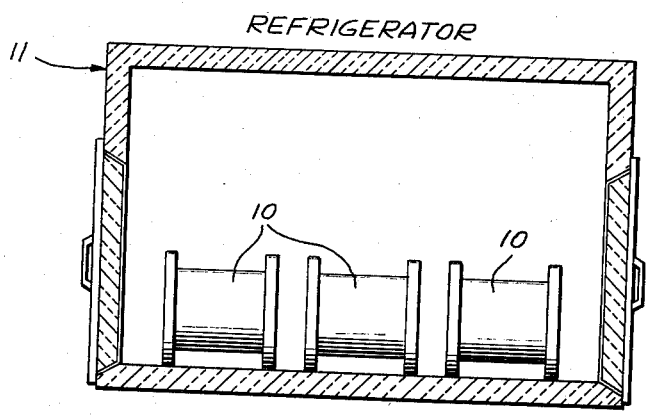

United States Patent Office 2,968,583
Patented Jan. 17, 1961

2,968,583
CAPACITOR SECTIONS AND METHODS OF MAKING THE SAME

Eugene I. Barth, Morris Plains, N.J., assignor to Western Electric Company, Incorporated, New York, N.Y., a corporation of New York Filed Apr. 25, 1957, Ser. No. 655,012

2 Claims. (Cl. 117—213)

The present invention relates generally to capacitor sections and methods of making the same, and more particularly to metallized films of polyethylene terephthalate having a thickness of approximately 0.00025 inch and methods of making such metallized films.

Many methods have been proposed for manufacturing capacitor sections, without the use of separate electrode foils, by applying a metal film to a dielectric sheet. These methods, while being superior to the use of separate foils, have been generally unsatisfactory because of the physical limitations of the specific dielectric used. It has been discovered that a thin web of polyethylene terephthalate polyester ("Mylar") coated with a film of metal makes an excellent capacitor section. While the term "Mylar" is exclusively used throughout this specification, it is to be readily understood that the herein disclosed process is readily adaptable to the vacuum deposition of metal films upon other types of polyesters.

Capacitors have recently been made using a web of "Mylar" of about 0.001 inch in thickness coated with a metal film. When using a "Mylar" web of this thickness, no serious manufacturing difficulties have been encountered at web speeds up to 2500 ft./min. To produce capacitors having still further miniaturized dimensional proportions, it became necessary to reduce the dielectric thickness.

When attempting to metallize a web of "Mylar" having a thickness of 0.00025 inch (25 gage), a serious problem manifested itself. It was found that the metallized "Mylar" contained longitudinal striations or wrinkles which caused discontinuities in the metal film, prevented smooth winding of capacitors therefrom, and caused electrical breakdowns in the striated areas; all of which defects cause a diminution in the quality of the finished product.

An analysis of the problem indicated that the striations were caused by excessive tension and/or a decrease in tensile strength of the "Mylar" web. The decrease in tensile strength was occasioned by an increased molecular activity within the "Mylar" web due to the heat input resulting from the condensation of hot metal vapor upon the web. When "Mylar" is made, it is reduced to the desired thickness by stretching which results in a planar orientation of the molecules. The increased molecular activity due to the hot vapor causes a reorientation of the molecules into a pattern of random distribution which results in a decrease in tensile strength. Since the winding apparatus used imparted no more tension to the web than was absolutely necessary to prevent slack and maintain control of the rapidly moving web, the solution to the problem must be found in a method of increasing the effective tensile strength of the "Mylar" at the time of metal deposition.

An examination of the relationship of the tensile strength of "Mylar" to its temperature shows that the tensile strength decreases at an approximate rate of 650 p.s.i. for every 20° F. increase in temperature up to a transition temperature of 175° F. at which point the rate changes to 1000 p.s.i. for every 20°. increase. In order to preclude the formation of striations or wrinkles in the metal coated web, it is necessary that the tensile strength of the "Mylar" be maintained during metal deposition by reducing the ultimate temperature reached by the coated "Mylar." Since the vaporization temperature of any metal is fixed, for any pressure equal to or below the critical pressure, the solution then must lie in some method of reducing the final web temperature which results from the heat imparted to the web by the hot metal vapor. The present invention contemplates a solution of the problem by the provision of a process wherein the temperature of the web is substantially reduced prior to any metallic vapor deposition.

It is therefore a principal object of this invention to provide a novel process for metallizing a temperature modulated web of 0.00025 inch "Mylar" at high speeds without creating striations or wrinkles therein.

It is another object of this invention to provide an inexpensive and simple method of producing smooth continuous metal film coatings on thin "Mylar" webs.

It is yet another object of this invention to provide striation free "Mylar" webs having a metal film deposited thereon by precooling the "Mylar" to increase the effective tensile strength of the "Mylar" webs at the time of metal deposition.

With the foregoing and other objects in view, a method of making capacitor sections, illustrating certain aspects of the invention, may include the step of precooling a roll of polyethylene terephthalate film having a thickness of approximately 0.00025 inch to a temperature of approximately −40° F. in a refrigerating unit. The precooled roll is then removed from the refrigerating unit and is inserted in a metallizing unit which normally operates at an absolute pressure of approximately 75 microns of mercury, where it is unrolled at a speed of the order of 2500 feet per minute. A minute quantity of silver vapor is first condensed on a surface of the precooled film to form a molecular layer of crystal forming nuclei thereon, followed by the condensation of sufficient zinc vapor on the silvered surface to form a zinc layer thereon having a thickness of approximately 0.000003 to 0.000005 inch. The metallized film is rewound into a roll, and then the rewound roll is removed from the metallizing unit.

A capacitor section according to the invention consists of a film of polyethylene terephthalate having a thickness of approximately 0.00025 inch, a molecular layer of metallic silver on a surface of the film, and a layer of metallic zinc on the silvered surface having a thickness of approximately 0.000003 to 0.000005 inch, when prepared by successive vacuum metallization of the silver and zinc on a moving film of the polyethylene terephthalate, the film having been precooled to a temperature of approximately −40° F. prior to the vacuum deposition of the metals thereon with the temperature of the film at the point of zinc deposition between lower than −25° F. Such a metallized film is free from longitudinal striations and wrinkles.

Figure 2:
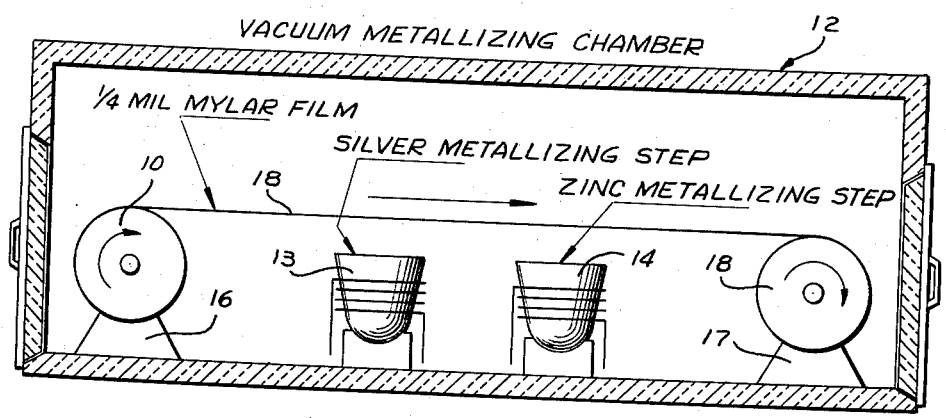

Other objects, advantages and aspects of the invention will appear from the following description of a specific example thereof, when taken in conjunction with the appended drawing, in which Fig. 1 represents a precooling chamber and Fig. 2 a vacuum metallizing chamber by which the process may be practiced.

A specific example of a method by which the invention has been successfully practiced is as follows. A roll 10 of "Mylar" was first precooled to −40° F. in a suitable refrigerating device 11. The roll was then removed from the refrigerating device and immediately inserted into a metallizing apparatus 12 which contained a small carbon crucible 13 having a minute quantity of molten silver therein, and a pot 14 of molten zinc. As soon as the roll was threaded into the unwinding and winding apparatus 16 and 17, respectively, the chamber was sealed and the pressure therein was promptly reduced to an absolute pressure of approximately 75 microns of mercury. This pressure reduction was accomplished in slightly more than 1 minute. The unwinding operation was then begun with the precooled web 18 of "Mylar" passing first over the silver crucible 13 and next over the zinc pot 14 and onto a winding spool 17. The winding speed was gradually increased until a speed of 2500 ft./min. was obtained.

The total evaporating surface of the molten silver was made quite small, relative to that of the molten zinc, and the majority of this surface was masked to control the amount of silver deposited. The masking coupled with the fact that molten silver evaporates quite slowly resulted in a silver coating on the "Mylar" which might be termed a molecular layer, i.e., the quantity of silver deposited was so minute that its presence was impossible of detection with the naked eye or even with various electrical tests. The silver could only be detected with suitable chemical tests. The purpose of the silver deposition was to provide the surface of the "Mylar" with crystal forming nuclei upon which the zinc vapor would readily condense. Because the quantity of silver vapor deposited was so minute, the temperature rise of the "Mylar" web was so small as to be insignificant.

The evaporating surface of the molten zinc was suitably masked so that the rate of evaporation of the molten zinc, coupled with the winding speed of 2500 ft./min., would provide a zinc film upon the surface of the "Mylar" having a thickness of approximately 0.000005 inch.

When the coating operation was completed, the rewound roll 18 of metallized "Mylar" was removed from the metallizing chamber 12. Examination of the metallized "Mylar" revealed a zinc coated web which was free of wrinkles, striations and any other discontinuities. Subsequent experimentation indicated that precooling temperature ranging from −25° F. to −100° F. would produce coated webs which were free of striations and discontinuities. Precooling to temperatures above −25° F. was found to be unsatisfactory while precooling to temperatures much below −100° F. will result in detrimental effects on the physical properties of "Mylar" including embrittlement.

While one specific example has been described in detail hereinabove, it will be obvious that various modifications may be made from the specific details described without departing from the spirit and scope of the invention.

What is claimed is:
1. The method of making capacitor sections, which comprises the steps of precooling a roll of polyethylene terephthalate film having a thickness of approximately 0.00025 inch to a temperature of approximately −40° F. in a refrigerating unit, removing the precooled roll from the refrigerating unit and inserting the same in a metallizing unit which normally operates at an absolute pressure of approximately 75 microns of mercury, unrolling the film in the metallizing unit at a speed of the order of 2500 feet per minute, condensing a minute quantity of silver vapor on a surface of the film to form a molecular layer of crystal forming nuclei thereon, condensing zinc vapor on the silvered surface to form a zinc layer thereon having a thickness of approximately 0.000003 to 0.000005 inch, rewinding the metallized film into a roll, and then removing the rewound roll from the metallizing unit.

2. A capacitor section consisting of a film of polyethylene terephthalate having a thickness of approximately 0.00025 inch, a molecular layer of metallic silver on a surface of the film, and a layer of metallic zinc on the silvered surface having a thickness of approximately 0.000003 to 0.000005 inch; said capacitor section having been prepared by successive vacuum metallization of the silver and zinc on a moving film of the polyethylene terephthalate, said film having been precooled to a temperature of approximately −40° F. prior to the vacuum deposition of the metals thereon with the temperature of the film at the point of zinc deposition being lower than −25° F., the metallized film being free from longitudinal striations and wrinkles.

References Cited in the file of this patent

UNITED STATES PATENTS

| | | |
|---|---|---|
| 1,203,303 | Bickett | Oct. 31, 1916 |
| 1,925,429 | Aitchison et al. | Sept. 5, 1933 |
| 2,074,281 | Sommer | Mar. 16, 1937 |
| 2,382,432 | McManus et al. | Aug. 14, 1945 |
| 2,665,227 | Clough et al. | Jan. 5, 1954 |
| 2,665,228 | Stauffer | Jan. 5, 1954 |
| 2,740,732 | Peck et al. | Apr. 3, 1956 |